United States Patent
Shiohara (10) Patent No.: US 9,098,793 B2
(45) Date of Patent: Aug. 4, 2015

(54) DATA PROCESSING APPARATUS, RECORDING APPARATUS AND CONTROL METHOD OF THE DATA PROCESSING APPARATUS

(71) Applicant: Seiko Epson Corporation, Tokyo (JP)

(72) Inventor: Susumu Shiohara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 13/859,683

(22) Filed: Apr. 9, 2013

(65) Prior Publication Data
US 2013/0265597 A1    Oct. 10, 2013

(30) Foreign Application Priority Data

Apr. 10, 2012  (JP) .................. 2012-089074

(51) Int. Cl.
*G06F 15/00*   (2006.01)
*G06K 1/00*    (2006.01)
*G06K 15/02*   (2006.01)
*G06F 3/12*    (2006.01)

(52) U.S. Cl.
CPC .......... *G06K 15/1807* (2013.01); *G06F 3/1208* (2013.01); *G06F 3/1247* (2013.01); *G06F 3/1257* (2013.01); *G06F 3/1258* (2013.01); *G06F 3/1285* (2013.01)

(58) Field of Classification Search
None
See application file for complete search history.

(56) References Cited

U.S. PATENT DOCUMENTS

| 7,460,252 B2 | 12/2008 | Campbell et al. | |
| 2005/0193334 A1* | 9/2005 | Ohashi et al. | 715/517 |
| 2009/0002751 A1 | 1/2009 | Gha et al. | |
| 2009/0262396 A1* | 10/2009 | Furuya | 358/1.15 |
| 2010/0313119 A1* | 12/2010 | Baldwin et al. | 715/256 |

FOREIGN PATENT DOCUMENTS

| JP | 06-328790 A | 11/1994 |
| JP | 2000-056685 A | 2/2000 |
| JP | 2006-172188 A | 6/2006 |

* cited by examiner

*Primary Examiner* — Vincent Rudolph
*Assistant Examiner* — Michael Burleson
(74) *Attorney, Agent, or Firm* — Kilpatrick Townsend & Stockton LLP (57) ABSTRACT

A data processing apparatus includes a processing unit that distinguishes a command of a first command system including commands designating attributes of a printing form and a command of a second command system including commands designating attributes that are not defined in the first command system. When a recording instruction including an instruction designating the printing form by a command of the first command system and data arranged in accordance with the printing form designated by the command of the first command system are input, the processing unit arranges the data included in the recording instruction in accordance with a printing form designated by the command of the second command system to generate recording data.

19 Claims, 5 Drawing Sheets

DATA PROCESSING APPARATUS, RECORDING APPARATUS AND CONTROL METHOD OF THE DATA PROCESSING APPARATUS

The disclosure of Japanese Patent Application No. 2012-089074 filed on Apr. 10, 2012, including specification, drawings and claims is incorporated herein by reference in its entirety.

BACKGROUND

1. Technical Field

The invention relates to a data processing apparatus that processes recording data, a recording apparatus and a control method of the data processing apparatus.

2. Related Art

In the related art, a receipt printer of a POS system and a printer for business use such as label printer that prints a goods label, a label for delivery and the like have been used. In the printer and a printer system, it is needed to improve an output expression performance of a printed material that is made by the existing apparatus introduced already, in many cases, for a poor output expressing performance of the existing apparatus. For example, there are needs to colorize a monochrome printed material. In this case, when replacing the whole system, the cost and time are consumed and the replacing may interfere in the business. Therefore, it is required to establish a system by using the existing system.

Regarding the improvement on the system, following technologies have been suggested. JP A-6-328790 discloses a technology enabling a print to be simply colorized using monochrome text data. Also, U.S. Pat. No. 7,460,252 B2 discloses a printing system capable of adding a graphic effect to a print output of a POS printer.

According to the technology disclosed in JP A-6-328790, a colorization target is the character or image that already exists. Also, it is not possible to change an output form of the whole printed material, such as addition of a new image object and designation of a whole color or background image.

Also, according to the technology disclosed in U.S. Pat. No. 7,460,252 B2, when a predetermined character string included in the original print data is detected, for example, an addition of a graphic effect is carried out for the character string that is a processing target. Since the target may be a receipt, this technology does not have an idea to change the output form of the whole printed material. Also, when the predetermined character string or a completely matched character string is not detected in the original print data, the processing is not executed. Therefore, a case where the graphic effect can be added is restricted.

SUMMARY

An advantage of some aspects of the invention is to provide a data processing apparatus capable of appropriately changing an output form of a whole printed material by using print data of an existing system. Specifically, an image processing apparatus for changing an output form of a printed material, a recording apparatus and a control method of the data processing apparatus are provided.

According an aspect of the invention, a data processing apparatus includes a processing unit that distinguishes a command of a first command system including commands designating attributes of a printing form and a command of a second command system including commands designating attributes that are not defined in the first command system. When a recording instruction including an instruction designating the printing form by a command of the first command system and data arranged in accordance with the printing form designated by the command of the first command system are input, the processing unit arranges the data included in the recording instruction in accordance with a printing form designated by the command of the second command system to generate recording data. In the recording data generation processing, the processing unit acquires the second template including a command of the commands included in the second command system which designates an attribute not defined in the first command system from the storage unit and generates the recording data in accordance with the second template acquired.

In this aspect, the data processing apparatus further includes a storage unit that stores one or more first templates defining the printing form by the command of the first command system and one or more second templates defining the printing form by the command of the second command system. When the recording instruction including an instruction designating the first template and data arranged in accordance with the first template are input, the processing unit arranges the data included in the recording instruction in accordance with the second template to generate the recording data. In the recording data generation processing, the processing unit acquires the second template including a command of the second command system which designates an attribute not defined in the first command system from the storage unit and generates the recording data in accordance with the second template acquired.

According to the above aspect of the invention, when an instruction of the first command system and data are input, it is possible to generate the recording data using the second command system having a command designating an attribute not defined in the first command system. For example, when an instruction of a command system for monochrome printing having no command designating a recording color and data are input, it is possible to generate recording data for color printing by using a command system corresponding to a color printing. Thereby, it is possible to introduce a recording apparatus capable of performing a recording that cannot be performed in the apparatus of the related art and corresponding to a command system different from the apparatus of the related art, without changing a configuration of the apparatus outputting a recording instruction and data. Also, the template that defines a printing form by the command of the second command system is stored and the recording data corresponding to the second command system is generated using the template. Therefore, it is possible to generate the recording data of an appropriate printing form, based on the instruction of the first command system and the data.

In The data processing apparatus above, when the recording instruction including the instruction designating the first template and the data arranged in accordance with the first template are input, the processing unit selectively executes processing for generating the recording data by acquiring the designated first template from the storage unit and arranging the data and the recording data generation processing.

According to the above aspect of the invention, it is possible to execute the processing of performing the conversion from the first command system to the second command system to thus generate the recording data corresponding to the second command system and the processing of generating the recording data corresponding to the first command system. Therefore, when updating the recording apparatus, it is possible to generate both the recording data that can be executed by the apparatus of the related art and the recording data that can be executed by a new recording apparatus corresponding to a command system different from the apparatus of the related art. Hence, it is possible to increase the degree of freedom of the configuration of the recording apparatus.

In the data processing apparatus above, in the recording data generation processing, the processing unit acquires the second template which emulates the printing form of the first template designated by the input recording instruction from the storage unit.

According to the above aspect of the invention, it is possible to generate the recording data corresponding to a different command system while suppressing a change in the printing form such as a size of a recording medium and a character size, for example.

In the data processing apparatus above, the storage unit stores the second templates in association with the first templates, respectively, and when the recording instruction including the instruction designating the first template and the data arranged in accordance with the first template are input, the processing unit arranges the data included in the recording instruction in accordance with the second template stored in association with the first template.

According to the above aspect of the invention, when the first template is designated, it is possible to select an appropriate second template. For example, when the second template is used which implements a printing form close to a case where the first template designated is used, it is possible to perform the conversion from the first command system to the second command system without changing the printing form. Thereby, it is possible to replace a recording apparatus corresponding to the first command system into a recording apparatus corresponding to a separate command system without changing a configuration of the apparatus outputting a recording instruction and data. Also, while keeping a part of attributes of the printing form, it is possible to change the other attributes. Hence, it is possible to arbitrarily change the printing form.

In the data processing apparatus above, the first command system is a command system in which a command defining a recording color is one or less and the second command system is a command system for color printing including two or more commands defining recording colors, and in the recording data generation processing, the processing unit acquires the second template including the commands designating the recording colors of the second command system from the storage unit.

According to the above aspect of the invention, it is possible to replace a recording apparatus performing monochrome printing into a recording apparatus corresponding to a command system for color printing without changing a configuration of the apparatus outputting a recording instruction and data, so that it is possible to implement the colorization of a printed material that is being printed in the monochrome manner.

In the data processing apparatus above, the data processing apparatus is connected to a host computer and a recording apparatus, and when the recording instruction including the instruction designating the first template and the data arranged in accordance with the first template are input from the host computer, the processing unit executes the recording data generation processing and outputs the recording data to the recording apparatus.

According to the above aspect of the invention, it is possible to replace a recording apparatus into a recording apparatus corresponding to a different command system without changing configurations of software and hardware of the host computer. Thus, it is possible to implement the colorization of a printed material that is being printed in the monochrome manner.

According to another aspect of the invention, a recording apparatus executes a recording operation in response to a command input from a host computer. The recording apparatus includes a processing unit that distinguishes a command of a first command system including commands designating attributes of a printing form and a command of a second command system including commands designating attributes that are not defined in the first command system, and a recording unit that executes a recording operation in response to the command of the second command system, When a recording instruction including an instruction designating the printing form by a command of the first command system and data arranged in accordance with the printing form designated by the command of the first command system are input, the processing unit arranges data included in the recording instruction, in accordance with a printing form designated by the command of the second command system to generate recording data and output the generated recording data to the recording unit.

In this aspect, the recording apparatus further includes a storage unit that stores one or more first templates defining the printing form by the command of the first command system and one or more second templates defining the printing form by the command of the second command system. When the recording instruction including an instruction designating the first template and data arranged in accordance with the first template are input, the processing unit arranges the data included in the recording instruction, in accordance with the second template to generate recording data and output the generated recording data to the recording unit. In the recording data generation processing, the processing unit acquires the second template including a command of the second command system which designates an attribute not defined in the first command system from the storage unit and generates the recording data in accordance with the second template acquired.

According to the above aspect of the invention, when the host computer outputs an instruction of the first command system and data, it is possible to generate the recording data using the second command system having a command designating an attribute not defined in the first command system. For example, when an instruction of a command system for monochrome printing having no command designating a recording color and data are input, it is possible to generate recording data for color printing by using a command system corresponding to a color printing. Thereby, it is possible to introduce a recording apparatus capable of performing a recording that cannot be performed in the apparatus of the related art and corresponding to a command system different from the apparatus of the related art, without changing a configuration of the host computer. Also, the template that defines a printing form by the command of the second command system is stored and the recording data corresponding to the second command system is generated using the template. Therefore, it is possible to generate the recording data of an appropriate printing form, based on the instruction of the first command system and the data.

In the recording apparatus above, the first command system is a command system in which a command defining a recording color is one or less and the second command system is a command system for color printing including two or more commands defining recording colors. In the recording data generation processing, the processing unit generates the recording data by acquiring the second template including the commands designating the recording colors of the second command system from the storage unit. The recording unit executes a color printing in accordance with the recording data.

According to the above aspect of the invention, it is possible to replace a recording apparatus performing monochrome printing into a recording apparatus corresponding to a command system for color printing without changing a configuration of the host computer, so that it is possible to implement the colorization of a printed material that is being printed in the monochrome manner.

According to another aspect of the invention, a control method of a data processing apparatus including a processing unit that distinguishes a command of a first command system including commands designating attributes of a printing form and a command of a second command system including commands designating attributes that are not defined in the first command system, the method includes generating the recording data by arranging data included in the recording instruction in accordance with a printing form designated by a command of the second command system when a recording instruction including an instruction designating the printing form by a command of the first command system and data arranged in accordance with a command of the first command system are input.

In the above aspect, the data processing apparatus further includes a storage unit that stores one or more first templates defining the printing form by the command of the first command system and one or more second templates defining the printing form by the command of the second command system. The control method further includes generating the recording data by arranging data included in the recording instruction in accordance with the second template when a recording instruction including an instruction designating the first template and data arranged in accordance with the first template are input and acquiring the second template including a command of the second command system which designates an attribute not defined in the first command system from the storage unit, and generating the recording data in accordance with the second template acquired in the acquiring step.

According to the invention, when an instruction of the first command system and data are input, it is possible to generate the recording data using the second command system having a command designating an attribute not defined in the first command system. For example, when an instruction of a command system for monochrome printing having no command designating a recording color and data are input, it is possible to generate recording data for color printing by using a command system corresponding to a color printing. Thereby, it is possible to introduce a recording apparatus capable of performing a recording that cannot be performed in the apparatus of the related art and corresponding to a command system different from the apparatus of the related art, without changing a configuration of the apparatus outputting a recording instruction and data. Also, the template that defines a printing form by the command of the second command system is stored and the recording data corresponding to the second command system is generated using the template. Therefore, it is possible to generate the recording data of an appropriate printing form, based on the instruction of the first command system and the data.

According to the invention, it is possible to introduce a recording apparatus capable of performing a recording that cannot be performed in the apparatus of the related art and corresponding to a command system different from the apparatus of the related art, without changing a configuration of the apparatus outputting a recording instruction and data. Therefore, for example, it is possible to implement the colorization of a printed material that is being printed in the monochrome manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an exemplary embodiment of the invention will be described with reference to the drawings.

Figure 1:
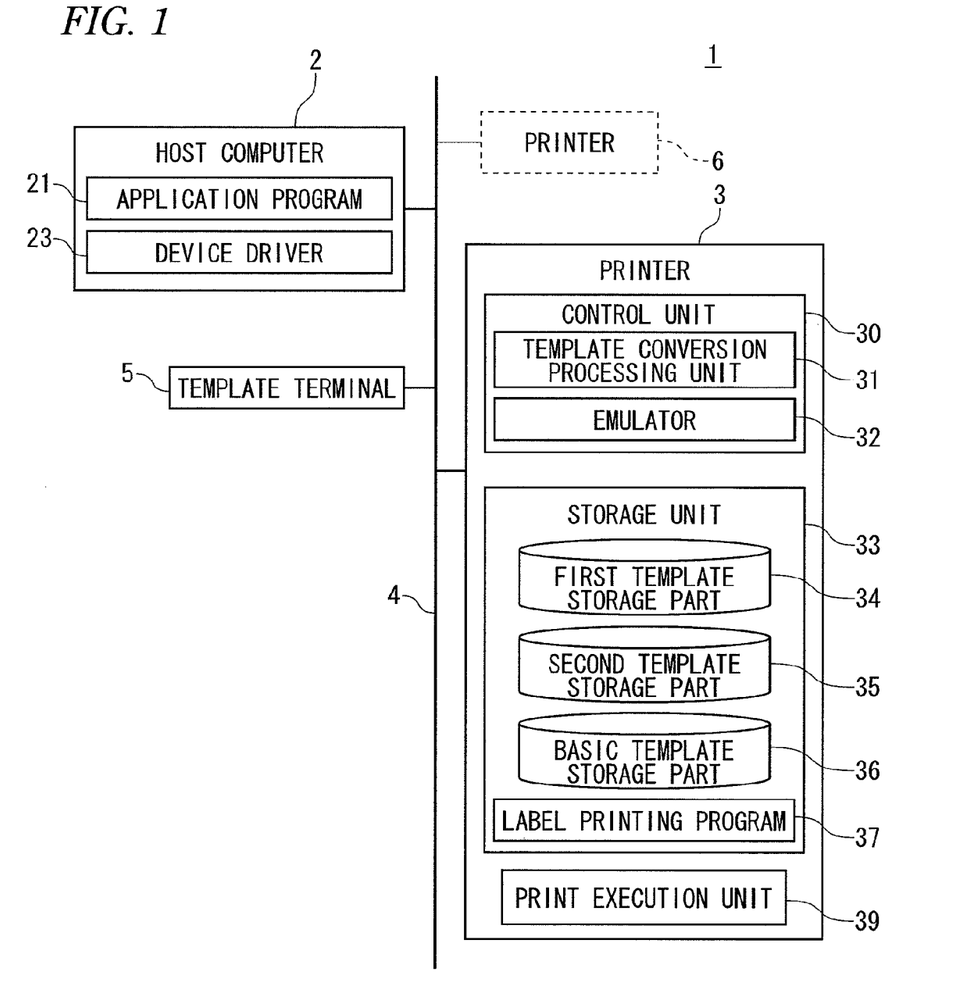
FIG. 1 is a functional block diagram of a printing system according to an exemplary embodiment.

FIG. 1 is a functional block diagram showing a configuration of a printing system 1 according to an exemplary embodiment.

As shown in FIG. 1, the printing system 1 is configured by connecting a host computer 2 outputting a printing instruction (recording instruction), a printer 3 (recording apparatus) and a template terminal 5 via a network 4. FIG. 1 includes a printer 6 that the printing system does not include for illustrative purposes.

The host computer 2 is a computer having a CPU that executes a program, a ROM that stores a basic control program to be executed or data to be processed by the CPU, a RAM that temporarily stores the executed program or the processed data by the CPU, a non-volatile storage device that stores the program or data, and the like. The host computer 2 has an application program 21 for executing processing such as document creation and outputs a printing instruction for a printer to print data prepared by the application program 21. In this exemplary embodiment, an example is described in which a character or image is printed on a label sheet having an adhesive material on a backside thereof, which is a cut sheet having a predetermined size. The application program 21 is an application program having functions of arranging a character or image in correspondence to a size of the label to prepare a print image and instructing a printing execution.

The host computer 2 has a device driver 23 that controls the printer. The device driver 23 is a program for controlling the printer 6, which is made in correspondence to hardware and software specifications of the printer 6. When the application program 21 instructs a printing execution, the device driver 23 prepares and outputs a printing instruction including a command of a command system (hereinafter, referred to as first command system) that can be interpreted by the printer 6, based on the print image prepared by the application program 21. The printing instruction that is generated by the device driver 23 includes text data and/or image data of the print image prepared by the application program 21 and a command that designates an arrangement of the text or image. The command included in the printing instruction is a command that is defined by the first command system.

The printing system 1 does not actually have the printer 6. The printing instruction that is transmitted from the host computer 2 is received and executed by the printer 3. As described below, the printer 3 emulates a function of the printer 6, analyzes the printing instruction described with the first command system, and prints a label in a printing form similar to a case where the printer 6 prints a label. That is, the printing system 1 is a system that removes the printer 6 from a system combining the host computer 2 and the printer 6 and connects the printer 3 instead of the printer 6. In this exemplary embodiment, an example is described in which the printer 6 performing a monochrome printing is replaced with the printer 3 capable of performing a color printing.

Also, the application program 21 and the device driver 23 of the host computer 2 are not changed from a state where the printer 6 is used.

The network 4 is a network connecting the host computer 2, the printer 3 and the template terminal 5 so that they performs communication each other, and is configured by a wired or wireless LAN based on the Ethernet (registered trademark) standard.

Also, the host computer 2 and the printer 3 may be connected to perform communication via an interface based on the USB or RS-232C standard. In this case, the host computer 2 and the printer 3 perform one-to-one communication in printing processing that will be described later. When the printer 3 is connected to the host computer 2 instead of the printer 6, if a network interface of the printer 3 is made to have the same network address as the network address of the interface of the printer 6 before the replacement, it is not necessary to change information designating a printer of a communication destination in the host computer 2. Also, when the printer 6 is connected to the host computer 2 by the USB or RS-232C, if the printer 3 is connected to the host computer 2 by the same connection method, it is not necessary to change information designating a printer of a communication destination in the host computer 2. By doing so, it is possible to replace the printer 6 with the printer 3 without making any changes for the host computer 2.

The printer 3 has a print executing unit 39 having hardware that executes a printing, such as printing head and conveyance roller, and a controller that controls the hardware, and performs printing on a label sheet and outputs a label by the print execution unit 39.

Also, the printer 3 has a control unit 30 that controls respective units of the printer 3. The control unit 30 has a template conversion processing unit 31 that executes template conversion processing in response to a request from the template terminal 5 and an emulator 32 that, when a printing instruction including a command of the first command system is transmitted from the host computer 2, analyzes and executes the command in the printing instruction.

Also, the printer 3 has a storage unit 33 (storage means) that non-volatilely stores the program or data. A storage area of the storage unit 33 is provided with a first template storage part 34, a second template storage part 35 and a basic template storage part 36. Also, the storage unit 33 stores therein a label printing program 37. The label printing program 37 is a program that operates in the same manner as the program that is executed by a controller (not shown) of the printer 6, and is used so that the emulator 32 emulates the operation of the printer 6.

The template is a set of information designating a printing form (printing form) of a printed material (label, in this exemplary embodiment) that is printed and output by the printer 3 or printer 6. Specifically, the template is a set of commands respectively designating attributes such as a label size, a text position in the label, the number of charters per line, the number of lines, a decoration of a text, a font size, a font type, an image size, an image position, margins of upper, lower, left and right parts and the like. Also, the template may include a text or image data. The text or image data configures a part of the template together with the attributes of the data.

The command of at least a part included in the template includes a parameter indicating a setting value of a corresponding attribute. In the printing system 1, a plurality of templates corresponding to the printing form of the label is used. When the template is designated by the application program 21 of the host computer 2, the device driver 23 outputs a printing instruction including the command designating the template and the printer 3 arranges a text or image in the template designated by the printing instruction, based on the text data and/or image data that is output together with the printing instruction, and performs a printing.

That is, the printing instruction that is generated by the device driver 23 may include a command for designating the template, instead of the command designating the arrangement of the text or image.

The first template storage part 34 of the printer 3 stores a first template configured by a command of the first command system. The first template is provided for each printing form of the label that has been printed by the printer 6. When the printer 6 is replaced with the printer 3, all the templates that are used by the printer 6 are copied into the first template storage part 34.

The second template storage part 35 stores a second template that is described by a command of a second command system different from the first command system. The second command system may be a command having compatibility with the first command system or a command that is not compatible with the first command system. The second command system includes, as a command designating the printing form, a command about an attribute that is not defined in the command of the first command system. In this exemplary embodiment, since the first command system includes commands for monochrome printing, the first command system does not include commands designating printing colors other than black and gray scale. The second command system includes commands that correspond to 16 color, 256 colors, 65536 colors or 1637 million colors and designate printing colors other than black and gray scale. Also, the second template may include text or image data, like the first template.

The second template that is stored in the second template storage part 35 is associated with any one of the first templates stored in the first template storage part 34 and is set to print a label in the same printing form as the corresponding first template. More specifically, the first templates stored in the first template storage part 34 are respectively given with names. The second templates stored in the second template storage part 35 are respectively given with the same names as the corresponding first templates. Therefore, the templates having the same names are stored in the first template storage part 34 and the second template storage part 35. The templates having the same names are templates for implementing the printing form corresponding to each other.

In the meantime, when an attribute that is defined with the command of the second command system is also defined with the command of the first command system, for example when there is a command that is not used in the first templates stored in the first template storage part 34, the invention can be applied. For example, when a command designating a printing color is included in the first command system and a command designating a color other than black is not used in the template stored in the first template storage unit 34, it can be said that a command designating the printing color is not defined in the first command system.

The basic template storage part 36 stores a basic template that the printer 3 uses as a default template. When the host computer 2 outputs a printing instruction that does not include the information designating a template and the emulator 32 receives the printing instruction, the emulator 32 arranges the text or image in accordance with the basic template that is stored in the basic template storage part 36.

The template terminal 5 is a terminal device for editing a template that designates a printing form of a label, and is configured by a PC, for example.

Figure 2:
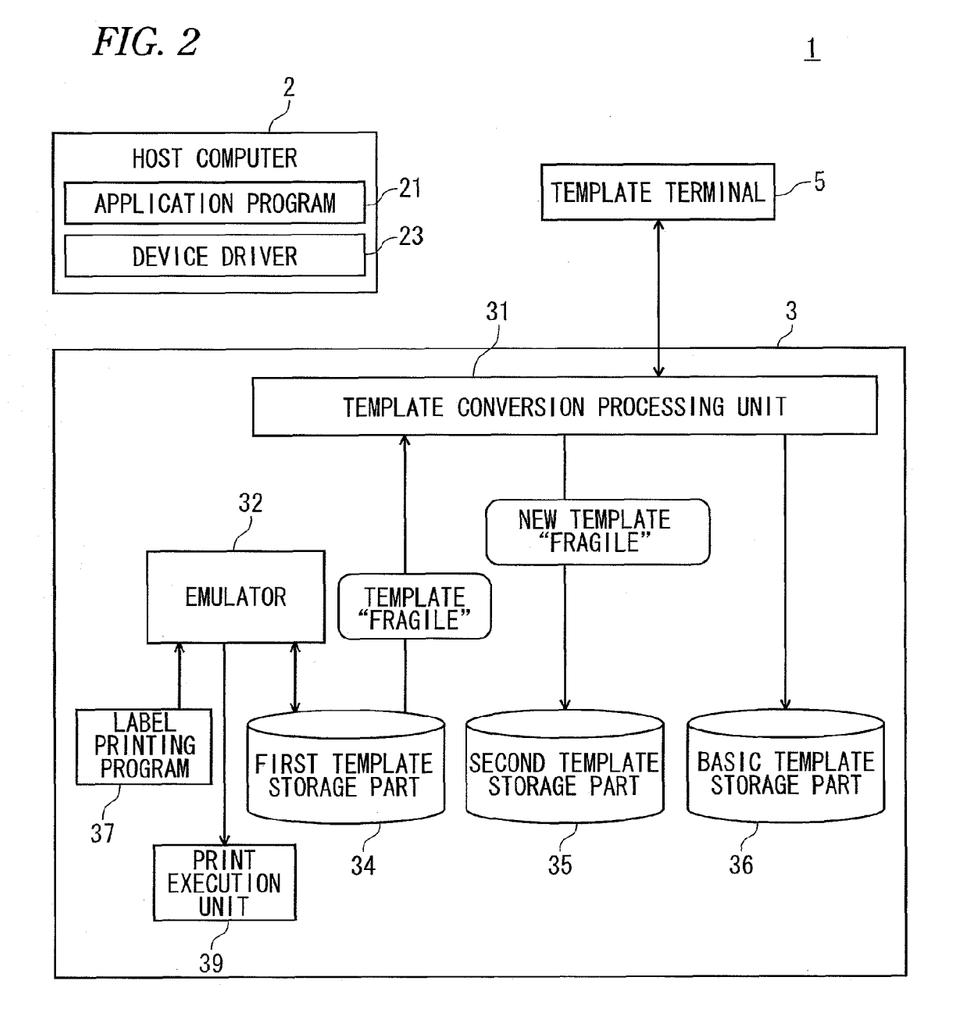
FIG. 2 illustrates operations relating to template conversion processing.
Figure 3:
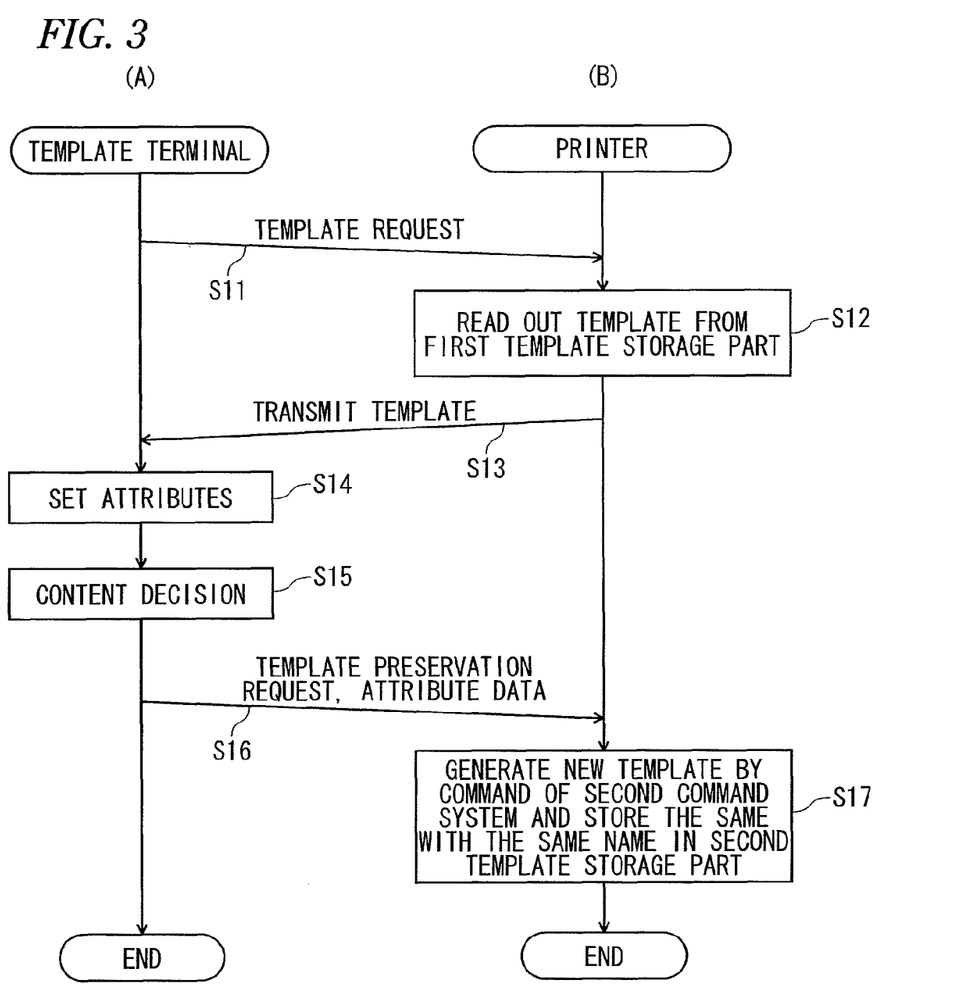
FIG. 3 illustrates a sequence of the template conversion processing.

FIG. 2 illustrates operations relating to template conversion processing and schematically shows a data flow in the printing system 1. Also, FIG. 3 illustrates a sequence of the template conversion processing, in which (A) side shows operations of the template terminal 5 and (B) side shows operations of the template conversion processing unit 31. In the below, the template conversion processing is described based on FIGS. 2 and 3.

In the template conversion processing, the template terminal 5 and the printer 3 transmits and receives the data each other. The template conversion processing unit 31 executes a function of a Web server, for example, and the template terminal 5 executes a function of a Web client, for example. In this case, the template conversion processing unit 31 transmits data of a WEB page for template processing in response to an access of the template terminal 5 and the template terminal 5 transmits a request to the printer 3, based on the data of the WEB page.

The template terminal 5 requests the template conversion processing unit 31 of the printer 3 to transmit the first template in response to an operation of a user or operation of a preset program (step S11). Here, the template terminal 5 may designate any one of the first templates stored in the first template storage part 34 or may request all the first templates. The template conversion processing unit 31 reads out the first template from the first template storage part 34 (step S12) and transmits the same to the template terminal 5 (step S13). As shown in FIG. 2, as an example, the first template having a name "Fragile" is transmitted to the template terminal 5.

The template terminal 5 receives the first template transmitted from the printer 3 and sets an attribute that is not defined in the first template (step S14). For example, the template terminal 5 designates an attribute indicating a printing color of a text or whether or not to color print an image for each of an arrangement frame of the text and an arrangement frame of the image arranged in the first template. Also, when the first template of a processing target includes the text or image data, the template terminal 5 edits the text data, replaces the image data and the like. When the attribute that should be set for the first template under the processing is decided (step S15), the template terminal 5 requests the printer 3 to preserve a new template including the designated attribute (step S16). Here, the template terminal 5 transmits the command to request the preservation of the template and data (including the command) designating the attribute newly designated to the command configuring the first template to the printer 3 (step S16). In step S16, the template terminal 5 may also transmit the first template for which the processing of designating the attribute has been performed. Also, when an edit of the text data or an edit or a replace of the image data is performed, the template terminal 5 transmits the processed text data and/or image data.

The template conversion processing unit 31 generates and preserves the second template by the command defined in the second command system, based on the template preservation request and data transmitted from the template terminal 5 (step S17). Specifically, the template conversion processing unit 31 generates the second template that describes the printing form, which reflects the attribute added or changed by the processing of the template terminal 5 in the printing form of the first template processed by the template terminal 5, by the command in the second command system. The second template may also include the text data or image data. That is, when the text data and/or image data is transmitted together with the template preservation request from the template terminal 5, the template conversion processing unit 31 generates the second template including the text data and/or image data. Then, the template conversion processing unit 31 gives the same name as the first template processed by the template terminal 5 to the second template generated and stores the same in the second template storage part 35. Thereby, it becomes clear that the second template generated in step S17 by the template conversion processing unit 31 is the template that is used instead of the first template processed by the template terminal 5.

Like this, it is possible to convert the first template, which has been used in the printer 6, into the second template by using the template terminal 5 and to preserve the converted second template in the printer 3. Since the second template is described with the command of the second command system that can be executed by the printer 3, it is possible to use the functions such as color printing that cannot be executed in the printer 3.

Figure 4:
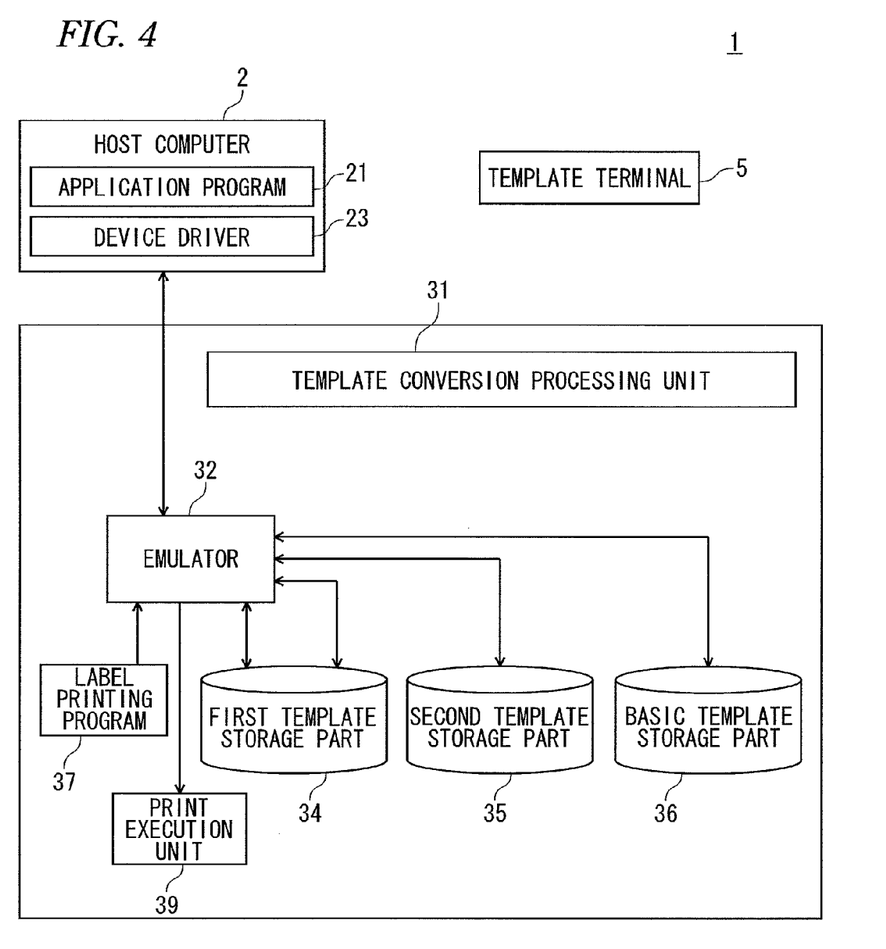
FIG. 4 illustrates operations relating to printing processing.

FIG. 4 illustrates operations relating to printing processing and schematically shows a data flow in the printing system 1. Also, FIG. 5 illustrates a sequence of the printing processing, in which (A) side shows operations of the host computer 2 and (B) side shows operations of the emulator 32 of the printer 3.

In the below, the printing processing is described with reference to FIGS. 4 and 5.

In the printing processing, the host computer 2 and the printer 3 transmit and receive the data each other. Meanwhile, when the host computer 2 and the printer 3 are connected one-to-one by the communication route such as USB or RS-232C, the printing processing is executed through the communication route.

Figure 5:
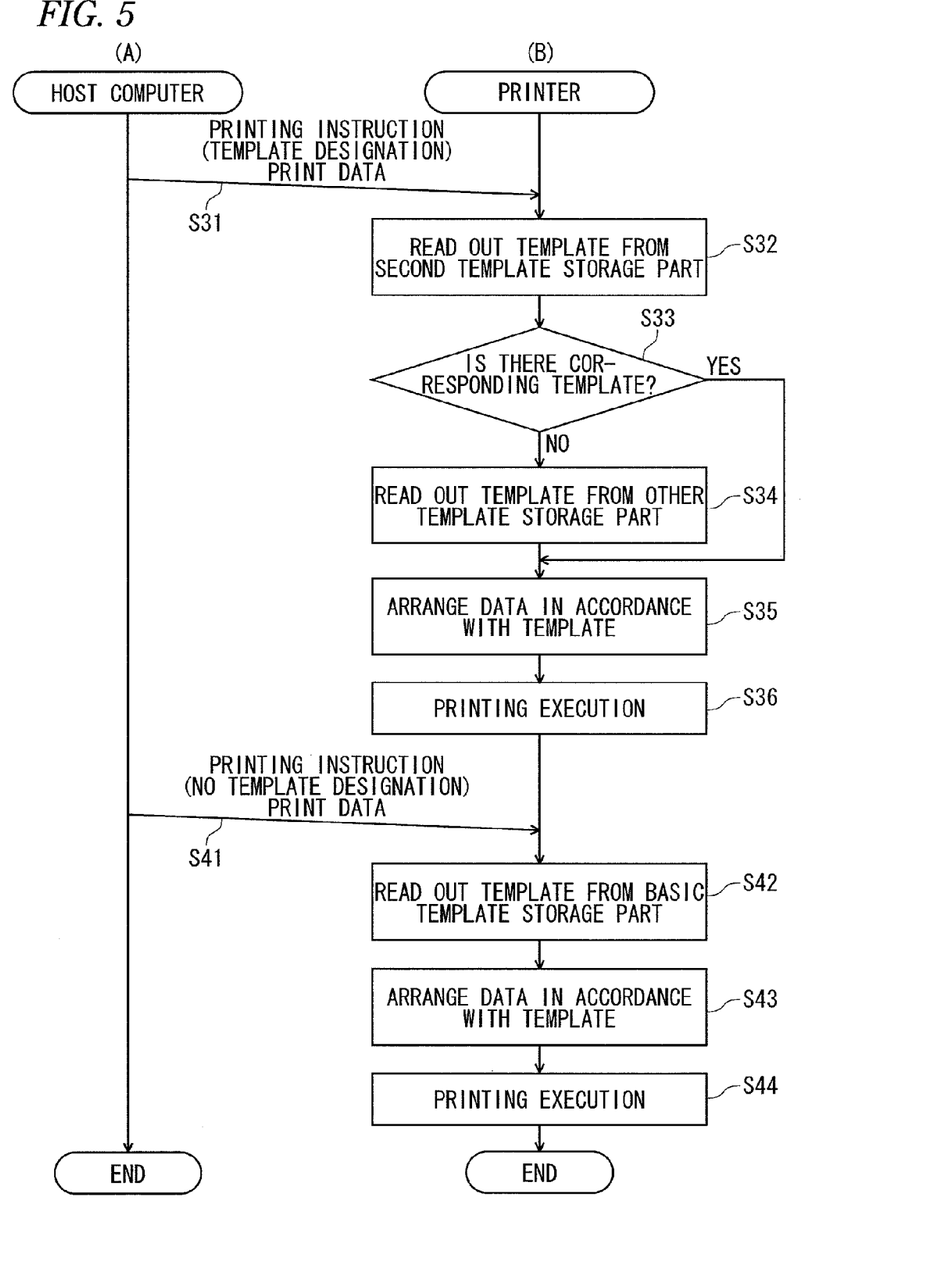
FIG. 5 illustrates a sequence of the printing processing.

Steps S32 to S35 of FIG. 5 correspond to the recording data generation processing of the invention, the emulator 32 that executes the processing corresponds to the processing means and the printer 3 corresponds to the data processing apparatus.

The printing processing starts as the host computer 2 executes the application program 21 in response to an operation of a user or operation of a preset program. When the application program 21 generates print data of a label and instructs a printing execution, the device driver 23 generates a printing instruction based on the first command system and transmits the same to the printer 3 together with the print data (text data and/or image data) (step S31). The printing instruction that is transmitted in step S31 includes a command that designates a template.

The emulator 32 receives the printing instruction and the print data, which are transmitted from the host computer 2, and reads out the second template, which corresponds to the template designated by the printing instruction, from the second template storage part 35 (step S32). The template that is designated by the printing instruction transmitted from the host computer 2 is the first template. Therefore, the emulator 32 reads out the second template corresponding to the designated first template. In this exemplary embodiment, each of the second templates is provided with the same name as the corresponding first template. Hence, the emulator 32 reads out the second template having the same name as that of the template included in the printing instruction from the second template storage part 35.

Here, the emulator 32 determines whether there is the corresponding second template in the second template storage part 35 (step S33). When there is no corresponding second template (step S33; No), the emulator reads out the designated first template from the first template storage part 34 (step S34). Also, when there is no corresponding first template in the first template storage part 34, the emulator 32 reads out the basic template from the basic template storage part 36.

After reading out the template from the first template storage part 34 or basic template storage part 36 in step S34 and when it is possible to read out the corresponding second template from the second template storage part 35 (step S33; Yes), the emulator 32 arranges the text data or image data, based on the read template, and generates data for printing (recording data) (step S35). After that, the emulator 32 controls the print execution unit 39 to print a label, based on the generated data for printing (step S36).

Also, the host computer 2 can prepare a label design by the functions of the application program 21, without using the template. In this case, the application program 21 outputs a printing instruction including a command (including a parameter) designating the attribute designated in the template, the text data and the image data. The device driver 23 transmits a printing instruction, which does not include a command designating a template, and the print data to the printer 3, based on the command and data output by the application program 21 (step S41).

Since the template is not designated by the printing instruction transmitted from the host computer 2, the emulator 32 reads out the basic template from the basic template storage part 36 (step S42). Then, the emulator 32 arranges the data, based on the basic template, and generates the data for printing (step S43). After that, the emulator 32 controls the print execution unit 39 to thus print a label, based on the generated data for printing (step S44).

As described above, according to the printing system 1 of the exemplary embodiment to which the invention is applied, the printer 3 has the emulator 32 that distinguishes the command of the first command system including the command designating the attribute of the printing form and the command of the second command system including the commands designating the attributes that are not defined in the first command system, and the storage unit 33 that stores one or more first templates defining the printing form by the commands of the first command system and one or more second templates defining the printing form by the commands of the second command system. When the printing instruction designating the first template and the print data including the data, which is arranged in accordance with the first template, are input, the emulator 32 executes the processing (recording data generation processing) of arranging the data, which is included in the print data, in accordance with the second template, to thus generate the print data. In this processing, the emulator acquires the second template including a command of the commands included in the second command system, which designates an attribute not defined in the first command system, from the storage unit 33 and generates the print data in accordance with the second template acquired. Also, the emulator 32 controls the print execution unit 39 and executes the printing in accordance with the generated print data.

Thereby, when the printing instruction including the command of the first command system corresponding to the printer 6 before the replacement is input, it is possible to generate the print data by using the second command system having the command designating the attribute not defined in the first command system, for example, the attribute about the printing color. Thereby, it is possible to introduce the printer 3 capable of performing the printing that cannot be performed in the printer 6 of the related art, without changing the configuration of the host computer 2. Furthermore, the second templates are stored in the second template storage part 35 and the print data corresponding to the second command system is generated using the second templates. Therefore, it is possible to generate the print data of the appropriate printing form, based on the printing instruction and data transmitted from the host computer 2.

Also, when the instruction designating the first template and the print data including the data, which is arranged in accordance with the first template, are input, the emulator 32 selectively executes the processing of acquiring the designated first template from the storage unit 33 and arranging the data to thus generate the print data and the print data generation processing. Therefore, in the configuration where the printer 6 is replaced with the printer 3, it is possible to generate and print the print data by using the first template and to generate and print the print data by using the second template. Therefore, it is possible to increase the degree of freedom of the configuration of the printer 3.

Furthermore, the emulator 32 acquires the second template, which emulates the printing form of the first template designated by the instruction transmitted from the host computer 2, from the storage unit 33. That is, the second template 32 is associated with the first template implementing the same printing form in the storage unit 33. The emulator 32 reads out the second template, which corresponds to the first template designated by the printing instruction transmitted from the host computer 2, and generates the data for printing. Therefore, it is possible to generate the print data corresponding to the other command system without changing the printing form such as label size. Also, when the first template is designated, it is possible to select the appropriate second template. Also, when the printer 6 is used, it is possible to conform the other attributes such as font size and font type while changing only a part of the attributes defining the printing form, such as attribute relating to the printing color. Like this, since it is possible to prepare the second template by the various modifications while utilizing the first template, it is possible to implement the various printing forms.

Also, the first command system is the command system that includes the commands defining only the printing colors of black and gray scale or does not include the commands of the printing colors and the second command system is the command system for color printing that includes the commands defining the printing colors. Therefore, it is possible to replace the printer 6 performing the monochrome printing with the printer 3 corresponding to the color printing, thereby implementing the colorization of the printed material that is printed in the monochrome manner.

Although the exemplary embodiment of the invention has been described, the invention is not limited thereto. For example, in the above exemplary embodiment, the second template that is stored in the second template storage part 35 of the printer 3 is provided with the same name as that of the corresponding first template, so that the first template and the second template are associated with each other. However, the invention is not limited thereto. For example, information defining a correspondence of the first template and the second template may be stored in the storage unit 33. In this case, the emulator 32 may select the second template, which corresponds to the first template designated by the printing instruction transmitted from the host computer 2, based on the information. Also, the names of the templates are not necessarily made to be the same. Also, in the above exemplary embodiment, when the second template, which corresponds to the first template designated by the printing instruction, is not stored in the second template storage unit 35, the first template is acquired from the first template storage part 34 and then the data for printing is generated. However, it may be possible to determine whether to use the first template or the second template by the content of the data transmitted together with the printing instruction or the parameter of the command included in the printing instruction and to selectively use the first template or second template to thus generate the data for printing.

Also, in the above exemplary embodiment, the label is printed using the printer 3. However, when recording the other recorded materials, the invention can be also applied.

Also, the functional blocks shown in FIGS. 1, 2 and 4 are implemented in cooperation with the hardware and the software. The specific mounting forms of the hardware and the specification of the software are arbitrary, and the other detailed configurations can be also arbitrarily changed. Also, the printer 3 is not particularly limited insomuch as it can execute the printing. For example, a variety of apparatuses such as a printer of an SIDM type, an inkjet printer, a thermal printer, a laser printer and the like can be also applied. Also, the invention is not limited to the independently useable device. For example, the invention can be also applied to an apparatus that is mounted to the other devices (ATM (Automated Teller Machine), CD (Cash Dispenser) and the like). Furthermore, the data processing apparatus of the invention is not limited to the printer 3 having the emulator 32 as the processing means. Also, when generating the data for printing by an apparatus such as a computer separately provided from the printer 3, the data processing apparatus of the invention can be also applied to the apparatus.

What is claimed is:

1. A data processing apparatus comprising:
   a processing unit that distinguishes a command of a first command system including commands designating attributes of a first printing form and a command of a second command system including commands designating attributes that are not defined in the first command system,
   wherein when a recording instruction including an instruction designating the first printing form by the command of the first command system and data arranged in accordance with the printing form designated by the command of the first command system are input, the processing unit arranges the data included in the recording instruction in accordance with a second printing form designated by the command of the second command system to generate recording data;
   wherein the commands of the first command system comprise a command defining a recording color which is one or less and the commands of the second command system comprise two or more commands defining recording colors, wherein the second command system is a command system for color printing.

2. The data processing apparatus according to claim 1 further comprising:
   a storage unit that stores one or more first templates defining the first printing form by the command of the first command system and one or more second templates defining the second printing form by the command of the second command system,
   wherein when the recording instruction including an instruction designating the first template and data arranged in accordance with the first template are input, the processing unit arranges the data included in the recording instruction in accordance with the second template to generate the recording data, and
   in the recording data generation processing, the processing unit acquires the second template including a command of the second command system which designates an attribute not defined in the first command system from the storage unit and generates the recording data in accordance with the second template acquired.

3. The data processing apparatus according to claim 2, wherein when the recording instruction including the instruction designating the first template and the data arranged in accordance with the first template are input, the processing unit selectively executes processing for generating the recording data by acquiring the designated first template from the storage unit and arranging the data and the recording data generation processing.

4. The data processing apparatus according to claim 2, wherein in the recording data generation processing, the processing unit acquires the second template which emulates the first printing form of the first template designated by the recording instruction input from the storage unit.

5. The data processing apparatus according to claim 2, wherein the storage unit stores the second templates in association with the first templates, respectively, and
   wherein when the recording instruction including the instruction designating the first template and the data arranged in accordance with the first template are input, the processing unit arranges the data included in the recording instruction in accordance with the second template stored in association with the first template.

6. The data processing apparatus according to claim 2,
   wherein in the recording data generation processing, the processing unit acquires the second template including the commands designating the recording colors of the second command system from the storage unit.

7. The data processing apparatus according to claim 2, wherein the data processing apparatus is connected to a host computer and a recording apparatus, and
   wherein when the recording instruction including the instruction designating the first template and the data arranged in accordance with the first template are input from the host computer, the processing unit executes the recording data generation processing and outputs the recording data to the recording apparatus.

8. A recording apparatus that executes a recording operation in response to a command input from a host computer, the recording apparatus comprising:
   a processing unit that distinguishes a command of a first command system including commands designating attributes of a first printing form and a command of a second command system including commands designating attributes that are not defined in the first command system; and
   a recording unit that executes a recording operation in response to the command of the second command system,
   wherein when a recording instruction including an instruction designating the first printing form by the command of the first command system and data arranged in accordance with the first printing form designated by the command of the first command system are input, the processing unit arranges the data included in the recording instruction in accordance with a second printing form designated by the command of the second command system to generate recording data;

wherein the commands of the first command system comprise a command defining a recording color which is one or less and the commands of the second command system comprise two or more commands defining recording colors, wherein the second command system is a command system for color printing.

9. The recording apparatus according to claim 8 further comprising: a storage unit that stores one or more first templates defining the first printing form by the command of the first command system and one or more second templates defining the second printing form by the command of the second command system, wherein when the recording instruction including an instruction designating the first template and data arranged in accordance with the first template are input, the processing unit arranges the data included in the recording instruction, in accordance with the second template to generate recording data and output the generated recording data to the recording unit, and in the recording data generation processing, the processing unit acquires the second template including a command of the second command system which designates an attribute not defined in the first command system from the storage unit and generates the recording data in accordance with the second template acquired.

10. The recording apparatus according to claim 9, wherein when the recording instruction including the instruction designating the first template and the data arranged in accordance with the first template are input, the processing unit selectively executes processing for generating the recording data by acquiring the designated first template from the storage unit and arranging the data and the recording data generation processing.

11. The recording apparatus according to claim 9, wherein in the recording data generation processing, the processing unit acquires the second template which emulates the first printing form of the first template designated by the recording instruction input from the storage unit.

12. The recording apparatus according to claim 9, wherein the storage unit stores the second templates in association with the first templates, respectively, and wherein when the recording instruction including the instruction designating the first template and the data arranged in accordance with the first template are input, the processing unit arranges the data included in the recording instruction in accordance with the second template stored in association with the first template.

13. The data processing apparatus according to claim 9, wherein in the recording data generation processing, the processing unit generates the recording data by acquiring the second template including the commands designating the recording colors of the second command system from the storage unit, and wherein the recording unit executes a color printing in accordance with the recording data.

14. A control method of a data processing apparatus including a processing unit that distinguishes a command of a first command system including commands designating attributes of a first printing form and a command of a second command system including commands designating attributes that are not defined in the first command system, the method comprising:

generating the recording data by arranging data included in the recording instruction in accordance with a second printing form designated by the command of the second command system when a recording instruction including an instruction designating the first printing form by a command of the first command system and data arranged in accordance with a command of the first command system are input;

wherein the commands of the first command system comprise a command defining a recording color which is one or less and the commands of the second command system comprise two or more commands defining recording colors, wherein the second command system is a command system for color printing.

15. The control method according to claim 14, wherein the data processing apparatus further includes a storage unit that stores one or more first templates defining the first printing form by the command of the first command system and one or more second templates defining the second printing form by the command of the second command system, the control method further comprising:

generating the recording data by arranging data included in the recording instruction in accordance with the second template when a recording instruction including an instruction designating the first template and data arranged in accordance with the first template are input;

acquiring the second template including a command of the second command system which designates an attribute not defined in the first command system from the storage unit; and generating the recording data in accordance with the second template acquired in the acquiring step.

16. The control method according to claim 14, wherein when the recording instruction including the instruction designating the first template and the data arranged in accordance with the first template are input, the processing unit selectively executes processing for generating the recording data by acquiring the designated first template from the storage unit and arranging the data and the recording data generation processing.

17. The control method according to claim 14, wherein in the recording data generation processing, the processing unit acquires the second template which emulates the first printing form of the first template designated by the recording instruction input from the storage unit.

18. The control method according to claim 14, wherein the storage unit stores the second templates in association with the first templates, respectively, and wherein when the recording instruction including the instruction designating the first template and the data arranged in accordance with the first template are input, the processing unit arranges the data included in the recording instruction in accordance with the second template stored in association with the first template.

19. The control method according to claim 14, wherein in the recording data generation processing, the processing unit acquires the second template including the commands designating the recording colors of the second command system from the storage unit.

* * * * *